US009900900B2

United States Patent
Yan et al.

(10) Patent No.: US 9,900,900 B2
(45) Date of Patent: Feb. 20, 2018

(54) MEASUREMENT METHOD, BASE STATION, AND USER EQUIPMENT

(71) Applicant: HUAWEI TECHNOLOGIES CO., LTD., Shenzhen (CN)

(72) Inventors: Zhiyu Yan, Beijing (CN); Sha Ma, Beijing (CN); Juan Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 201 days.

(21) Appl. No.: 14/879,315

(22) Filed: Oct. 9, 2015

(65) Prior Publication Data
US 2016/0037548 A1    Feb. 4, 2016

Related U.S. Application Data

(63) Continuation of application No. PCT/CN2013/073937, filed on Apr. 9, 2013.

(51) Int. Cl.
*H04W 72/12* (2009.01)
*H04W 24/10* (2009.01)

(52) U.S. Cl.
CPC ....... *H04W 72/1231* (2013.01); *H04W 24/10* (2013.01); *H04W 72/1226* (2013.01)

(58) Field of Classification Search
CPC ............. H04W 52/325; H04W 52/267; H04W 52/146; H04W 52/38
See application file for complete search history.

(56) References Cited

U.S. PATENT DOCUMENTS

2012/0213137 A1* 8/2012 Jeong ................ H04W 52/0212
                                                           370/311
2013/0084910 A1* 4/2013 Suzuki ................ H04W 24/02
                                                           455/515
(Continued)

FOREIGN PATENT DOCUMENTS

CN    101938299    1/2011
CN    102281128    12/2011
(Continued)

OTHER PUBLICATIONS

Extended European Search Report dated Feb. 16, 2016 in corresponding European Patent Application No. 13881984.2.
(Continued)

*Primary Examiner* — Edan Orgad
*Assistant Examiner* — Emmanuel Maglo
(74) *Attorney, Agent, or Firm* — Staas & Halsey LLP

(57) ABSTRACT

In a measurement method, a base station, and a user equipment, the measurement method includes: sending, by a base station, signaling to a user equipment, where the signaling carries node indication information, where the node indication information is used to indicate nodes corresponding to channel state information measurement sets configured by the base station for the user equipment. In this way, the user equipment can learn, according to the node indication information, the nodes corresponding to the channel state information measurement sets configured by the base station for the user equipment; then, the user equipment can measure the nodes corresponding to the channel state information measurement sets on the channel state information measurement sets configured by the base station for the user equipment and provide feedback, so that the base station can schedule the user equipment according to a measurement result of the user equipment.

16 Claims, 3 Drawing Sheets

(56) References Cited

U.S. PATENT DOCUMENTS

| | | | |
|---|---|---|---|
| 2013/0279343 A1* | 10/2013 | Jeong | H04W 24/10 370/241 |
| 2013/0301465 A1* | 11/2013 | Seo | H04B 7/0626 370/252 |
| 2014/0161093 A1* | 6/2014 | Hoshino | H04B 7/024 370/329 |
| 2014/0198744 A1* | 7/2014 | Wang | H04B 7/0617 370/329 |
| 2014/0219131 A1* | 8/2014 | Yang | H04W 24/10 370/252 |
| 2015/0016419 A1* | 1/2015 | Kim | H04W 36/04 370/331 |
| 2015/0036530 A1* | 2/2015 | Wu | H04L 5/0073 370/252 |

FOREIGN PATENT DOCUMENTS

| | | |
|---|---|---|
| CN | 102480756 | 5/2012 |
| CN | 102761401 | 10/2012 |
| WO | 2012/061982 A1 | 5/2012 |
| WO | 2012/064085 | 5/2012 |
| WO | 2012/158959 A1 | 11/2012 |

OTHER PUBLICATIONS

International Search Report dated Jan. 9, 2014, in corresponding International Application No. PCT/CN2013/073937.
PCT International Search Report dated Jan. 9, 2014 in corresponding International Patent Application No. PCT/CN2013/073937.

* cited by examiner

MEASUREMENT METHOD, BASE STATION, AND USER EQUIPMENT

CROSS-REFERENCE TO RELATED APPLICATIONS

This application is a continuation of International Application No. PCT/CN 2013/073937, filed on Apr. 9, 2013, which is hereby incorporated by reference in its entirety.

TECHNICAL FIELD

Embodiments of the present invention relate to the field of communications technologies, and in particular, to a measurement method, a base station, and a user equipment.

BACKGROUND

In a Long Term Evolution (LTE) system, a smallest unit of a resource is a resource element (RE). An RE is a symbol in a time domain and is a subcarrier in a frequency domain. A resource block (RB) is a smallest unit for resource scheduling. An RB is a timeslot in the time domain and is 12 contiguous subcarriers in the frequency domain.

A heterogeneous network refers to a network including nodes with different powers. These nodes may include a macro base station (macro evolved NodeB, hereinafter referred to as macro eNB), a micro cell (Pico Cell), a home evolved NodeB (HeNB), a relay, and the like. Compared with a homogeneous network (that is, a network including macro base stations having a same transmit power), when heterogeneous network technologies are used, because an additional new serving node is introduced, an effect of cell splitting can be achieved, thereby improving system performance. However, in the heterogeneous network, because a low-power serving node is introduced, an interference scenario is different from that in the homogeneous network. If working frequencies of an interfering cell and an interfered-with cell are the same, a time division multiplexing (TDM) solution and a frequency division multiplexing (FDM) solution may be used to solve a problem of interference on a data channel.

In the TDM solution, an interfering cell (for example, a macro cell) transmits signals of different power levels in different subframes. In this way, because a low transmit power is allocated to some subframes or no data is sent in some subframes, these subframes are referred to as almost blank subframes (ABS). Therefore, in these subframes, an interfered-with cell (for example, a Pico Cell) schedules a user equipment (UE) in these subframes, where the user equipment is easily affected by the interfering cell, so as to reduce interference from the interfering cell (for example, the macro cell) to the UE in these subframes, thereby solving a problem of strong interference to the interfered-with cell (for example, the Pico Cell).

Because an ABS is introduced, interference features in different subframes may differ greatly. If measured subframes are not distinguished, it may cause wrong scheduling by a base station (evolved NodeB, hereinafter referred to as eNB). Therefore, the prior art introduces two subframe sets $C_{CSI,0}$ and $C_{CSI,1}$, which are used to measure resource-restricted channel state information (CSI) and provide feedback. Specifically, subframes having a same interference feature are grouped into one set, and a network may configure UE to perform channel quality indication (CQI) measurement and reporting in each of the two subframe sets. In this way, the eNB can schedule the UE in a more targeted manner according to measurement results that are reported by the UE and acquired in different measurement sets. However, similarly, the foregoing two measurement sets correspond to a same node connected to the UE.

In the prior art, a multiple stream aggregation (MSA) scenario is introduced in an LTE system, that is, one UE may be connected to multiple stations at the same time and receives service data from the multiple stations. The UE in the MSA scenario has a feature of dual connectivity, that is, one UE may be connected to multiple stations at the same time. For example, one UE may be connected to a macro base station and a micro base station (Pico eNB, hereinafter referred to as PeNB), where the macro base station and the PeNB may have a same frequency or may have different frequencies. Coverage areas of PeNBs are small, and if a UE moves fast, the UE easily moves from a coverage area of one PeNB into a coverage area of another PeNB frequently, causing frequent handovers of the UE. Dual connectivity enables a UE to keep connected to a macro base station and a PeNB at the same time, where the macro base station provides the UE with a service for content related to mobility management and a real-time service, while the PeNB provides only a data service. In this way, dual connectivity can avoid frequent handovers.

In the MSA scenario, for a UE on an edge of a coverage area of a Pico, a macro cell may serve the UE in a specific subframe (for example, a non-ABS of the macro cell) of the macro cell, while the Pico Cell serves the UE in a specific subframe (for example, a subframe corresponding to an ABS of the macro cell) of the Pico Cell. In this case, CSI measurement performed by the UE on the macro cell and the Pico Cell needs to correspond to a resource that can serve the UE, so that reference can be made to corresponding channel state information to satisfy a requirement for proper scheduling.

That is, in the MSA scenario, at least two transmission points provide data transmission services for a UE, and each serving point serves the UE in only a specific radio resource set.

In the prior art, there may be two sets on a node, and after a UE is notified of a configuration condition of the two sets, the UE performs CSI measurement on each of the two sets and provides feedback, so that a base station can perform data scheduling for the UE on a suitable resource.

However, in the prior art, only in a case in which two restricted measurement sets are from a same transmission point and only two restricted CSI measurement sets are configured on a node, a UE can be notified of a restricted measurement resource, but in an MSA scenario, when one or more specific radio resource sets are configured on each transmission point for the UE, the UE cannot be notified of the foregoing configured specific radio resource set.

SUMMARY

The present invention provides a measurement method, a base station, and a user equipment, so that when one or more specific radio resource sets are configured on each transmission point for a user equipment, the user equipment can be notified of the foregoing configured specific radio resource set.

According to a first aspect, the present invention provides a measurement method, including:

sending, by a base station, signaling to a user equipment, where the signaling carries node indication information, where the node indication information is used to indicate nodes corresponding to channel state information measurement sets configured by the base station for the user equipment, so that the user equipment measures, according to the node indication information, the nodes corresponding to the channel state information measurement sets on a resource corresponding to the channel state information measurement sets configured by the base station for the user equipment; and receiving, by the base station, a measurement result reported by the user equipment, and scheduling the user equipment according to the measurement result.

With reference to the first aspect, in a first possible implementation manner of the first aspect, that the signaling carries node indication information, where the node indication information is used to indicate nodes corresponding to channel state information measurement sets configured by the base station for the user equipment includes that:

a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

With reference to the first possible implementation manner of the first aspect, in a second possible implementation manner of the first aspect, if the user equipment works in a multiple-stream-aggregation state, the nodes corresponding to the channel state information measurement sets and indicated by the values of the at least two channel state information measurement subframe set indication fields are completely different or completely the same or partially the same; or if the user equipment works in a non-multiple-stream-aggregation state, the nodes corresponding to the channel state information measurement sets and indicated by the values of the at least two channel state information measurement subframe set indication fields are a same node.

With reference to the first aspect, in a third possible implementation manner of the first aspect, the signaling further carries measurement set indication information, where the measurement set indication information is used to indicate the channel state information measurement sets configured by the base station on the nodes for the user equipment.

With reference to the third possible implementation manner of the first aspect, in a fourth possible implementation manner of the first aspect, that the signaling carries node indication information, where the node indication information is used to indicate nodes corresponding to channel state information measurement sets configured by the base station for the user equipment includes that:

a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling further carries measurement set indication information, where the measurement set indication information is used to indicate the channel state information measurement sets configured by the base station on the nodes for the user equipment includes that:

the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

According to a second aspect, the present invention provides a measurement method, including:

receiving, by a user equipment, signaling sent by a base station, where the signaling carries node indication information, where the node indication information is used to indicate nodes corresponding to channel state information measurement sets configured by the base station for the user equipment;

measuring, by the user equipment according to the node indication information, the nodes corresponding to the channel state information measurement sets on a resource corresponding to the channel state information measurement sets configured by the base station for the user equipment; and reporting, by the user equipment, a measurement result to the base station, so that the base station schedules the user equipment according to the measurement result.

With reference to the second aspect, in a first possible implementation manner of the second aspect, that the signaling carries node indication information, where the node indication information is used to indicate nodes corresponding to channel state information measurement sets configured by the base station for the user equipment includes that:

a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

With reference to the first possible implementation manner of the second aspect, in a second possible implementation manner of the second aspect, if the user equipment works in a multiple-stream-aggregation state, the nodes corresponding to the channel state information measurement sets and indicated by the values of the at least two channel state information measurement subframe set indication fields are completely different or completely the same or partially the same; or if the user equipment works in a non-multiple-stream-aggregation state, the nodes corresponding to the channel state information measurement sets and indicated by the values of the at least two channel state information measurement subframe set indication fields are a same node.

With reference to the second aspect, in a third possible implementation manner of the second aspect, the signaling further carries measurement set indication information, where the measurement set indication information is used to indicate the channel state information measurement sets configured by the base station on the nodes for the user equipment.

With reference to the third possible implementation manner of the second aspect, in a fourth possible implementation manner of the second aspect, that the signaling carries node indication information, where the node indication information is used to indicate nodes corresponding to channel state information measurement sets configured by the base station for the user equipment includes that:

a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling further carries measurement set indication information, where the measurement set indication information is used to indicate the channel state information measurement sets configured by the base station on the nodes for the user equipment includes that:

the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

According to a third aspect, the present invention provides a base station, including:

a sending module, configured to send signaling to a user equipment, where the signaling carries node indication information, where the node indication information is used to indicate nodes corresponding to channel state information measurement sets configured by the base station for the user equipment, so that the user equipment measures, according to the node indication information, the nodes corresponding to the channel state information measurement sets on a resource corresponding to the channel state information measurement sets configured by the base station for the user equipment; and a receiving module, configured to receive a measurement result reported by the user equipment, and schedule the user equipment according to the measurement result.

With reference to the third aspect, in a first possible implementation manner of the third aspect, that the signaling sent by the sending module carries node indication information, where the node indication information is used to indicate nodes corresponding to channel state information measurement sets configured by the base station for the user equipment includes that:

a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

With reference to the first possible implementation manner of the third aspect, in a second possible implementation manner of the third aspect, if the user equipment works in a multiple-stream-aggregation state, the nodes corresponding to the channel state information measurement sets and indicated by the values of the at least two channel state information measurement subframe set indication fields are completely different or completely the same or partially the same; or if the user equipment works in a non-multiple-stream-aggregation state, the nodes corresponding to the channel state information measurement sets and indicated by the values of the at least two channel state information measurement subframe set indication fields are a same node.

With reference to the third aspect, in a third possible implementation manner of the third aspect, the signaling sent by the sending module further carries measurement set indication information, where the measurement set indication information is used to indicate the channel state information measurement sets configured by the base station on the nodes for the user equipment.

With reference to the third possible implementation manner of the third aspect, in a fourth possible implementation manner of the third aspect, that the signaling sent by the sending module carries node indication information, where the node indication information is used to indicate nodes corresponding to channel state information measurement sets configured by the base station for the user equipment includes that:

a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling sent by the sending module further carries measurement set indication information, where the measurement set indication information is used to indicate the channel state information measurement sets configured by the base station on the nodes for the user equipment includes that:

the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

According to a fourth aspect, the present invention provides a user equipment, including:

a receiving module, configured to receive signaling sent by a base station, where the signaling carries node indication information, where the node indication information is used to indicate nodes corresponding to channel state information measurement sets configured by the base station for the user equipment;

a measurement module, configured to measure, according to the node indication information received by the receiving module, the nodes corresponding to the channel state information measurement sets on a resource corresponding to the channel state information measurement sets configured by the base station for the user equipment; and a sending module, configured to report a measurement result acquired by the measurement module to the base station, so that the base station schedules the user equipment according to the measurement result.

With reference to the fourth aspect, in a first possible implementation manner of the fourth aspect, that the signaling received by the receiving module carries node indication information, where the node indication information is used to indicate nodes corresponding to channel state information measurement sets configured by the base station for the user equipment includes that:

a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

With reference to the first possible implementation manner of the fourth aspect, in a second possible implementation manner of the fourth aspect, if the user equipment works in a multiple-stream-aggregation state, the nodes corresponding to the channel state information measurement sets and indicated by the values of the at least two channel state information measurement subframe set indication fields are completely different or completely the same or partially the same; or if the user equipment works in a non-multiple-stream-aggregation state, the nodes corresponding to the channel state information measurement sets and indicated by the values of the at least two channel state information measurement subframe set indication fields are a same node.

With reference to the fourth aspect, in a third possible implementation manner of the fourth aspect, the signaling received by the receiving module further carries measurement set indication information, where the measurement set indication information is used to indicate the channel state information measurement sets configured by the base station on the nodes for the user equipment.

With reference to the third possible implementation manner of the fourth aspect, in a fourth possible implementation manner of the fourth aspect, that the signaling received by the receiving module carries node indication information, where the node indication information is used to indicate nodes corresponding to channel state information measurement sets configured by the base station for the user equipment includes that:

a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling received by the receiving module further carries measurement set indication information, where the measurement set indication information is used to indicate the channel state information measurement sets configured by the base station on the nodes for the user equipment includes that:

the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

According to a fifth aspect, the present invention provides a base station, including: a transmitter, a receiver, a memory, and a processor that is connected to the transmitter, the receiver, and the memory, where the memory is configured to store a group of program code;

the processor is configured to invoke the program code stored in the memory;

the transmitter is configured to send signaling to a user equipment, where the signaling carries node indication information, where the node indication information is used to indicate nodes corresponding to channel state information measurement sets configured by the base station for the user equipment, so that the user equipment measures, according to the node indication information, the nodes corresponding to the channel state information measurement sets on a resource corresponding to the channel state information measurement sets configured by the base station for the user equipment; and the receiver is configured to receive a measurement result reported by the user equipment, and schedule the user equipment according to the measurement result.

With reference to the fifth aspect, in a first possible implementation manner of the fifth aspect, that the signaling sent by the transmitter carries node indication information, where the node indication information is used to indicate nodes corresponding to channel state information measurement sets configured by the base station for the user equipment includes that:

a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

With reference to the first possible implementation manner of the fifth aspect, in a second possible implementation manner of the fifth aspect, if the user equipment works in a multiple-stream-aggregation state, the nodes corresponding to the channel state information measurement sets and indicated by the values of the at least two channel state information measurement subframe set indication fields are completely different or completely the same or partially the same; or if the user equipment works in a non-multiple-stream-aggregation state, the nodes corresponding to the channel state information measurement sets and indicated by the values of the at least two channel state information measurement subframe set indication fields are a same node.

With reference to the fifth aspect, in a third possible implementation manner of the fifth aspect, the signaling sent by the transmitter further carries measurement set indication information, where the measurement set indication information is used to indicate the channel state information measurement sets configured by the base station on the nodes for the user equipment.

With reference to the third possible implementation manner of the fifth aspect, in a fourth possible implementation manner of the fifth aspect, that the signaling sent by the transmitter carries node indication information, where the node indication information is used to indicate nodes corresponding to channel state information measurement sets configured by the base station for the user equipment includes that:

a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling sent by the transmitter further carries measurement set indication information, where the measurement set indication information is used to indicate the channel state information measurement sets configured by the base station on the nodes for the user equipment includes that:

the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

According to a sixth aspect, the present invention provides a user equipment, including: a transmitter, a receiver, a memory, and a processor that is connected to the transmitter, the receiver, and the memory, where the memory is configured to store a group of program code;

the receiver is configured to receive signaling sent by a base station, where the signaling carries node indication information, where the node indication information is used to indicate nodes corresponding to channel state information measurement sets configured by the base station for the user equipment;

the processor is configured to invoke the program code stored in the memory, to measure, according to the node indication information received by the receiver, the nodes corresponding to the channel state information measurement sets on a resource corresponding to the channel state information measurement sets configured by the base station for the user equipment; and the transmitter is configured to report a measurement result acquired by the processor to the base station, so that the base station schedules the user equipment according to the measurement result.

With reference to the sixth aspect, in a first possible implementation manner of the sixth aspect, that the signaling received by the receiver carries node indication information, where the node indication information is used to indicate nodes corresponding to channel state information measurement sets configured by the base station for the user equipment includes that:

a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

With reference to the first possible implementation manner of the sixth aspect, in a second possible implementation manner of the sixth aspect, if the user equipment works in a multiple-stream-aggregation state, the nodes corresponding to the channel state information measurement sets and indicated by the values of the at least two channel state information measurement subframe set indication fields are completely different or completely the same or partially the same; or if the user equipment works in a non-multiple-stream-aggregation state, the nodes corresponding to the channel state information measurement sets and indicated by the values of the at least two channel state information measurement subframe set indication fields are a same node.

With reference to the sixth aspect, in a third possible implementation manner of the sixth aspect, the signaling received by the receiver further carries measurement set indication information, where the measurement set indication information is used to indicate the channel state information measurement sets configured by the base station on the nodes for the user equipment.

With reference to the third possible implementation manner of the sixth aspect, in a fourth possible implementation manner of the sixth aspect, that the signaling received by the receiver carries node indication information, where the node indication information is used to indicate nodes corresponding to channel state information measurement sets configured by the base station for the user equipment includes that:

a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling received by the receiver further carries measurement set indication information, where the measurement set indication information is used to indicate the channel state information measurement sets configured by the base station on the nodes for the user equipment includes that:

the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

Technical effects of the present invention are as follows: signaling sent by a base station to a user equipment carries node indication information, where the node indication information is used to indicate nodes corresponding to channel state information measurement sets configured by the base station for the user equipment. In this way, the user equipment can learn, according to the node indication information, the nodes corresponding to the channel state information measurement sets configured by the base station for the user equipment; then, the user equipment can measure the nodes corresponding to the channel state information measurement sets on a resource corresponding to the channel state information measurement sets configured by the base station for the user equipment and provide feedback, so that the base station can schedule the user equipment according to a measurement result of the user equipment.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
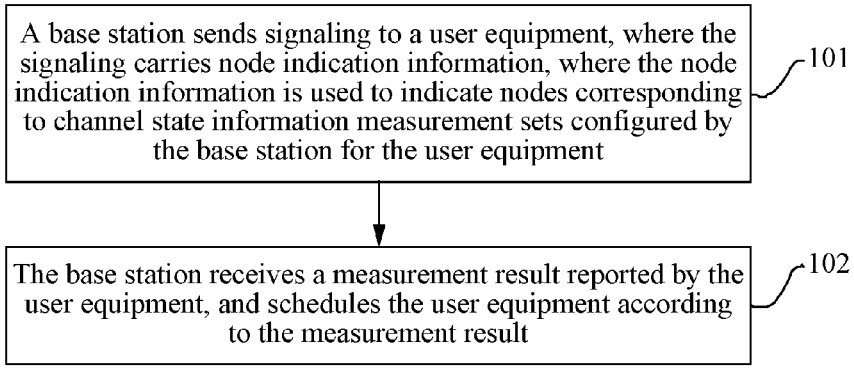
FIG. 1 is a flowchart of a measurement method according to an embodiment of the present invention.

FIG. 1 is a flowchart of a measurement method according to an embodiment of the present invention. As shown in FIG. 1, the measurement method may include:

Step 101: A base station sends signaling to a user equipment, where the signaling carries node indication information, where the node indication information is used to indicate nodes corresponding to channel state information measurement sets configured by the base station for the user equipment, so that the user equipment measures, according to the node indication information, the nodes corresponding to the channel state information measurement sets on a resource corresponding to the channel state information measurement sets configured by the base station for the user equipment.

Step 102: The base station receives a measurement result reported by the user equipment, and schedules the user equipment according to the measurement result.

In the foregoing embodiment, signaling sent by a base station to a user equipment carries node indication information, where the node indication information is used to indicate nodes corresponding to channel state information measurement sets configured by the base station for the user equipment. In this way, the user equipment can learn, according to the node indication information, the nodes corresponding to the channel state information measurement sets configured by the base station for the user equipment; then, the user equipment can measure the nodes corresponding to the channel state information measurement sets on a resource corresponding to the channel state information measurement sets configured by the base station for the user equipment and provide feedback, so that the base station can schedule the user equipment according to a measurement result of the user equipment.

In a specific implementation manner of the embodiment shown in FIG. 1 of the present invention, on the basis of restricted resource CSI measurement sets currently configured for the user equipment, node indication information may be added, where the node indication information is used to indicate nodes corresponding to the restricted resource CSI measurement sets. Specifically, in step 101 in the embodiment shown in FIG. 1 of the present invention, that the signaling carries node indication information, where the node indication information is used to indicate nodes corresponding to channel state information measurement sets configured by the base station for the user equipment may be that: a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

The channel state information subframe pattern configuration parameter field may be CSI-SubframePatternConfig-r12, and the channel state information measurement subframe set indication field may be a csi-MeasSubframeSetCellId-r12 field. Certainly, this is merely an example, and this embodiment of the present invention is not limited thereto. Specific representation forms of the channel state information subframe pattern configuration parameter and the channel state information measurement subframe set indication field are not limited in this embodiment of the present invention.

For example, a csi-MeasSubframeSet1CellId-r12 field and a csi-MeasSubframeSet2CellId-r12 field may be added to CSI-SubframePatternConfig-r12, where a value of the csi-MeasSubframeSet1CellId-r12 field indicates a node corresponding to csi-MeasSubframeSet1-r10, and a value of the csi-MeasSubframeSet2CellId-r12 field indicates a node corresponding to csi-MeasSubframeSet2-r10. Specific implementation may be as follows:

```
CSI-SubframePatternConfig-r12     CHOICE {
  release                         NULL,
  setup                           SEQUENCE {
    csi-MeasSubframeSet1-r10        MeasSubframePattern-r10,
    csi-MeasSubframeSet1CellId-r12  PhysCellId
    csi-MeasSubframeSet2-r10        MeasSubframePattern-r10
    csi-MeasSubframeSet2CellId-r12  PhysCellId
  }
}
```

Figure 2:
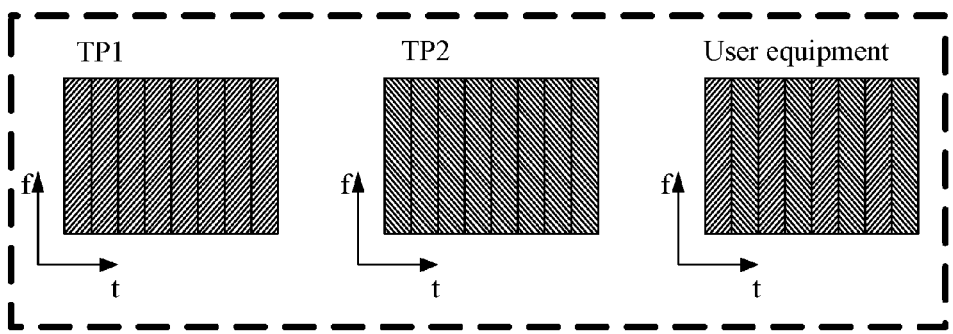
FIG. 2 is a schematic diagram of a resource set of a serving node of a user equipment working in an MSA state according to an embodiment of the present invention.

In this case, if the user equipment works in an MSA state, the nodes corresponding to the channel state information measurement sets and indicated by the values of the at least two channel state information measurement subframe set indication fields are completely different or completely the same or partially the same. Specifically, FIG. 2 is a schematic diagram of a resource set of a serving node of a user equipment working in an MSA state according to an embodiment of the present invention. As can be seen from FIG. 2, the channel state information measurement sets configured by the base station for the user equipment include csi-MeasSubframeSet1-r10 and csi-MeasSubframeSet2-r10, where csi-MeasSubframeSet1-r10 is an odd-number subframe set on a TP1, and csi-MeasSubframeSet2-r10 is an even-number subframe set on a TP2. In this case, a csi-MeasSubframeSet1CellId-r12 field and a csi-MeasSubframeSet2CellId-r12 field may be added to CSI-SubframePatternConfig-r12, where a value of the csi-MeasSubframeSet1CellId-r12 field is used to indicate that a node corresponding to csi-MeasSubframeSet1-r10 is the TP1, and a value of the csi-MeasSubframeSet2CellId-r12 field is used to indicate that a node corresponding to csi-MeasSubframeSet2-r10 is the TP2.

Certainly, FIG. 2 shows merely an embodiment of a channel state information measurement set configured by the base station for the user equipment. In FIG. 2, the base station configures only two channel state information measurement sets for the user equipment, and the two channel state information measurement sets are on different nodes. This embodiment of the present invention is not limited thereto; and the base station may configure at least two channel state information measurement sets for the user equipment, and nodes corresponding to the at least two channel state information measurement sets are completely different or completely the same or partially the same.

That nodes corresponding to the at least two channel state information measurement sets are completely different or completely the same or partially the same includes the following cases:

(1) the nodes corresponding to the at least two channel state information measurement sets are completely different;

(2) the nodes corresponding to the at least two channel state information measurement sets are a same node; and (3) some of the at least two channel state information measurement sets correspond to a same node, and the other sets correspond to at least one node.

For example, the channel state information measurement sets configured by the base station for the user equipment may include csi-MeasSubframeSet1-r10, csi-MeasSubframeSet2-r10, csi-MeasSubframeSet3-r10, and csi-MeasSubframeSet4-r10, where csi-MeasSubframeSet1-r10 and csi-MeasSubframeSet2-r10 are subframe sets on a TP1, csi-MeasSubframeSet3-r10 is a subframe set on a TP2, and csi-MeasSubframeSet4-r10 is a subframe set on a TP3. In this case, a csi-MeasSubframeSet1CellId-r12 field, a csi-MeasSubframeSet2CellId-r12 field, a csi-MeasSubframeSet3CellId-r12 field, and a csi-MeasSubframeSet4CellId-r12 field may be added to CSI-SubframePatternConfig-r12, where a value of the csi-MeasSubframeSet1CellId-r12 field is used to indicate that a node corresponding to csi-MeasSubframeSet1-r10 is the TP1, a value of the csi-MeasSubframeSet2CellId-r12 field is used to indicate that a node corresponding to csi-MeasSubframeSet2-r10 is the TP1, a value of the csi-MeasSubframeSet3CellId-r12 field is used to indicate that a node corresponding to csi-MeasSubframeSet3-r10 is the TP2, and a value of the csi-MeasSubframeSet4CellId-r12 field is used to indicate that a node corresponding to csi-MeasSubframeSet4-r10 is the TP3.

Figure 3:
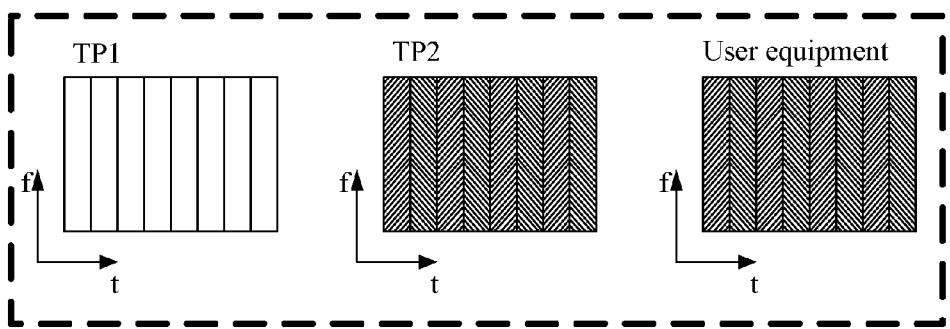
FIG. 3 is a schematic diagram of a resource set of a serving node of a user equipment working in a non-MS A state according to an embodiment of the present invention.

If the user equipment works in a non-MSA state, the nodes corresponding to the channel state information measurement sets and indicated by the values of the at least two channel state information measurement subframe set indication fields are a same node. Specifically, FIG. 3 is a schematic diagram of a resource set of a serving node of a user equipment working in a non-MSA state according to an embodiment of the present invention. As can be seen from FIG. 3, the channel state information measurement sets configured by the base station for the user equipment include csi-MeasSubframeSet1-r10 and csi-MeasSubframeSet2-r10, where csi-MeasSubframeSet1-r10 is an odd-number subframe set on a TP2, and csi-MeasSubframeSet2-r10 is an even-number subframe set on the TP2. In this case, a csi-MeasSubframeSet1CellId-r12 field and a csi-MeasSubframeSet2CellId-r12 field may be added to CSI-SubframePatternConfig-r12, where a value of the csi-MeasSubframeSet1CellId-r12 field is used to indicate that a node corresponding to csi-MeasSubframeSet1-r10 is the TP2, and a value of the csi-MeasSubframeSet2CellId-r12 field is used to indicate that a node corresponding to csi-MeasSubframeSet2-r10 is the TP2.

In another specific implementation manner of the embodiment shown in FIG. 1 of the present invention, further, in step 101 in the embodiment shown in FIG. 1 of the present invention, the signaling may further carry measurement set indication information, where the measurement set indication information is used to indicate the channel state information measurement sets configured by the base station on the nodes for the user equipment.

Specifically, in step 101 in the embodiment shown in FIG. 1 of the present invention, that the signaling carries node indication information, where the node indication information is used to indicate nodes corresponding to channel state information measurement sets configured by the base station for the user equipment may be that: a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling may further carry measurement set indication information, where the measurement set indication information is used to indicate the channel state information measurement sets configured by the base station on the nodes for the user equipment may be that: the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

The channel state information measurement subframe indication field may be a csi-MeasSubframeCellId-r12 field, and the channel state information subframe pattern configuration parameter field may be a csi-SubframePatternConfig-r12 field. Certainly, this is merely an example, and this embodiment of the present invention is not limited thereto. Specific representation forms of the channel state information measurement subframe indication field and the channel state information subframe pattern configuration parameter field are not limited in this embodiment of the present invention.

For example, a csi-MeasSubframeCellId-r12 field may be newly added to CQI-ReportConfig-r12, where values of the csi-MeasSubframeCellId-r12 field indicate the nodes corresponding to the channel state information measurement sets configured by the base station for the user equipment; and a csi-SubframePatternConfig-r12 field is newly added to CQI-ReportConfig-r12, where values of the csi-SubframePatternConfig-r12 field indicate at least one channel state information measurement set configured by the base station on the nodes for the user equipment. Specific implementation may be as follows:

```
CQI-ReportConfig-r12 ::= SEQUENCE {
    ......
    csi-MeasSubframeCellId-r12      PhysCellId
    csi-SubframePatternConfig-r12
    ......
}
csi-SubframePatternConfig-r12 ::= CHOICE {
    release                         NULL,
    setup                           CHOICE {
        csi-MeasSubframeSet1-r12        MeasSubframePattern-r10,
        csi-MeasSubframeSet2-r12        CHOICE {
            release                         NULL,
            setup                           CHOICE {
                csi-MeasSubframeSet2-r10
        MeasSubframePattern-r10
            }
        }
    }
}
```

In this case, if the user equipment works in an MSA state, the base station may set the channel state information measurement subframe indication field to a first value, so as to indicate that a first channel state information measurement set configured by the base station for the user equipment corresponds to a first node; and set the channel state information subframe pattern configuration parameter field to a second value, so as to indicate that the first channel state information measurement set configured by the base station on the first node for the user equipment is a set indicated by the second value; and/or the base station sets the channel state information measurement subframe indication field to a third value, so as to indicate that a second channel state information measurement set configured by the base station for the user equipment corresponds to a second node; and sets the channel state information subframe pattern configuration parameter field to a fourth value, so as to indicate that the second channel state information measurement set configured by the base station on the second node for the user equipment is a set indicated by the fourth value.

The foregoing is merely an example, and this embodiment of the present invention is not limited thereto. If the user equipment works in an MSA state, the base station may configure at least two channel state information measurement sets for the user equipment, a channel state information measurement subframe indication field may be newly added to a configuration parameter carried in the signaling, and the channel state information measurement subframe indication field may be set to different values, so as to indicate nodes corresponding to the at least two channel state information measurement sets configured by the base station for the user equipment. It should be noted that the nodes corresponding to the at least two channel state information measurement sets configured by the base station for the user equipment are completely different or completely the same or partially the same, which includes the following cases:

(1) the nodes corresponding to the at least two channel state information measurement sets are completely different;

(2) the nodes corresponding to the at least two channel state information measurement sets are a same node; and (3) some of the at least two channel state information measurement sets correspond to a same node, and the other sets correspond to at least one node.

If the user equipment works in a non-MSA state, the base station sets the channel state information measurement subframe indication field to a fifth value, so as to indicate a node corresponding to channel state information measurement sets configured by the base station for the user equipment; and sets the channel state information subframe pattern configuration parameter field to a sixth value and a seventh value, so as to indicate that the two channel state information measurement sets configured by the base station on the node for the user equipment are a set indicated by the sixth value and a set indicated by the seventh value.

That the base station configures two channel state information measurement sets on a node for the user equipment in a non-MSA state is merely used as an example for description in the foregoing, and this embodiment of the present invention is not limited thereto. If the user equipment works in a non-MSA state, the base station may configure at least one channel state information measurement set on a node for the user equipment, and different values of the channel state information subframe pattern configuration parameter field can indicate the at least one channel state information measurement set configured by the base station on the node for the user equipment.

For example, the base station may set the channel state information measurement subframe indication field to a fifth value, so as to indicate a node corresponding to channel state information measurement sets configured by the base station for the user equipment; and set the channel state information subframe pattern configuration parameter field to a sixth value, a seventh value, and an eighth value, so as to indicate that the channel state information measurement sets configured by the base station on the node for the user equipment are a set indicated by the sixth value, a set indicated by the seventh value, and a set indicated by the eighth value.

In this embodiment of the present invention, the channel state information measurement sets configured by the base station for the user equipment are orthogonal.

Figure 4:
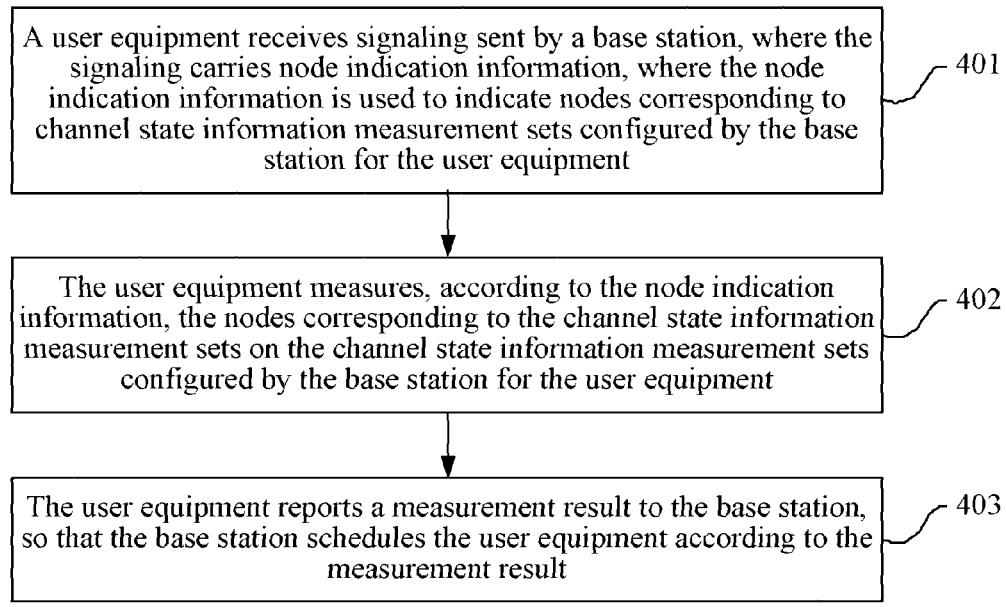
FIG. 4 is a flowchart of a measurement method according to another embodiment of the present invention.

FIG. 4 is a flowchart of a measurement method according to another embodiment of the present invention. As shown in FIG. 4, the measurement method may include:

Step 401: A user equipment receives signaling sent by a base station, where the signaling carries node indication information, where the node indication information is used to indicate nodes corresponding to channel state information measurement sets configured by the base station for the user equipment.

Step 402: The user equipment measures, according to the node indication information, the nodes corresponding to the channel state information measurement sets on a resource corresponding to the channel state information measurement sets configured by the base station for the user equipment.

Step 403: The user equipment reports a measurement result to the base station, so that the base station schedules the user equipment according to the measurement result.

In an implementation manner of this embodiment, in step 401, that the signaling carries node indication information, where the node indication information is used to indicate nodes corresponding to channel state information measurement sets configured by the base station for the user equipment may be that: a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

The channel state information subframe pattern configuration parameter field may be CSI-SubframePatternConfig-r12, and the channel state information measurement subframe set indication field may be a csi-MeasSubframeSetCellId-r12 field. Certainly, this is merely an example, and this embodiment of the present invention is not limited thereto. Specific representation forms of the channel state information subframe pattern configuration parameter and the channel state information measurement subframe set indication field are not limited in this embodiment of the present invention.

The channel state information subframe pattern configuration parameter field may be CSI-SubframePatternConfig-r12, and the channel state information measurement subframe set indication field may be a csi-MeasSubframeSetCellId-r12 field. Certainly, this is merely an example, and this embodiment of the present invention is not limited thereto. Specific representation forms of the channel state information subframe pattern configuration parameter and the channel state information measurement subframe set indication field are not limited in this embodiment of the present invention.

In this case, if the user equipment works in an MSA state, the nodes corresponding to the channel state information measurement sets and indicated by the values of the at least two channel state information measurement subframe set indication fields are completely different or completely the same or partially the same; or if the user equipment works in a non-MSA state, the nodes corresponding to the channel state information measurement sets and indicated by the values of the at least two channel state information measurement subframe set indication fields are a same node.

In another implementation manner of this embodiment, in step 401, the signaling received by the user equipment further carries measurement set indication information, where the measurement set indication information is used to indicate the channel state information measurement sets configured by the base station on the nodes for the user equipment.

Specifically, that the signaling carries node indication information, where the node indication information is used to indicate nodes corresponding to channel state information measurement sets configured by the base station for the user equipment may be that: a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling further carries measurement set indication information, where the measurement set indication information is used to indicate the channel state information measurement sets configured by the base station on the nodes for the user equipment may be that: the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

In this implementation manner, if the user equipment works in an MSA state, when a value of the channel state information measurement subframe indication field is a first value, it indicates that a first channel state information measurement set configured by the base station for the user equipment corresponds to a first node; and when a value of the channel state information subframe pattern configuration parameter field is a second value, it indicates that the first channel state information measurement set configured by the base station on the first node for the user equipment is a set indicated by the second value; and/or when a value of the channel state information measurement subframe indication field is a third value, it indicates that a second channel state information measurement set configured by the base station for the user equipment corresponds to a second node; and when a value of the channel state information subframe pattern configuration parameter field is a fourth value, it indicates that the second channel state information measurement set configured by the base station on the second node for the user equipment is a set indicated by the fourth value.

The foregoing is merely an example, and this embodiment of the present invention is not limited thereto. If the user equipment works in an MSA state, the base station may configure at least two channel state information measurement sets for the user equipment, and in this case, a channel state information measurement subframe indication field may be newly added to a configuration parameter carried in the signaling, where different values of the channel state information measurement subframe indication field indicate nodes corresponding to the at least two channel state information measurement sets configured by the base station for the user equipment. It should be noted that the nodes corresponding to the at least two channel state information measurement sets configured by the base station for the user equipment are completely different or completely the same or partially the same, which includes the following cases:

(1) the nodes corresponding to the at least two channel state information measurement sets are completely different;

(2) the nodes corresponding to the at least two channel state information measurement sets are a same node; and (3) some of the at least two channel state information measurement sets correspond to a same node, and the other sets correspond to at least one node.

If the user equipment works in a non-MSA state, when a value of the channel state information measurement subframe indication field is a fifth value, it indicates a node corresponding to channel state information measurement sets configured by the base station for the user equipment; and when values of the channel state information subframe pattern configuration parameter field are a sixth value and a seventh value, it indicates that the at least two channel state information measurement sets configured by the base station on the node for the user equipment are a set indicated by the sixth value and a set indicated by the seventh value.

That the base station configures two channel state information measurement sets on a node for the user equipment in a non-MSA state is merely used as an example for description in the foregoing, and this embodiment of the present invention is not limited thereto. If the user equipment works in a non-MSA state, the base station may configure at least one channel state information measurement set on a node for the user equipment, and different values of the channel state information subframe pattern configuration parameter field indicate the at least one channel state information measurement set configured by the base station on the node for the user equipment.

For example, the base station may set the channel state information measurement subframe indication field to a fifth value, so as to indicate a node corresponding to channel state information measurement sets configured by the base station for the user equipment; and set the channel state information subframe pattern configuration parameter field to a sixth value, a seventh value, and an eighth value, so as to indicate that the channel state information measurement sets configured by the base station on the node for the user equipment are a set indicated by the sixth value, a set indicated by the seventh value, and a set indicated by the eighth value.

In the foregoing embodiment, signaling sent by a base station to a user equipment carries node indication information, where the node indication information is used to indicate nodes corresponding to channel state information measurement sets configured by the base station for the user equipment. In this way, the user equipment can learn, according to the node indication information, the nodes corresponding to the channel state information measurement sets configured by the base station for the user equipment; then, the user equipment can measure the nodes corresponding to the channel state information measurement sets on a resource corresponding to the channel state information measurement sets configured by the base station for the user equipment and provide feedback, so that the base station can schedule the user equipment according to a measurement result of the user equipment.

According to the measurement method provided in the embodiments of the present invention, the node indication information is added, to indicate the nodes corresponding to the channel state information measurement sets configured by the base station for the user equipment, so that a same message can be used for resource configuration for restricted CSI measurement sets in an MSA scenario and a non-MSA scenario, and therefore, measurement resource configuration is flexible.

Persons of ordinary skill in the art may understand that all or some of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes: any medium that can store program code, such as a ROM, a RAM, a magnetic disk, or an optical disc.

Figure 5:
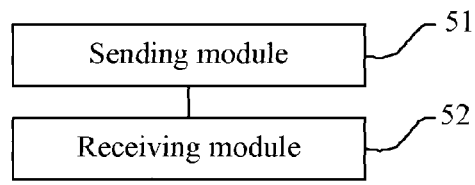
FIG. 5 is a schematic structural diagram of a base station according to an embodiment of the present invention.

FIG. 5 is a schematic structural diagram of a base station according to an embodiment of the present invention. The base station in this embodiment can implement the process of the embodiment shown in FIG. 1 of the present invention. As shown in FIG. 5, the base station may include: a sending module 51 and a receiving module 52, where the sending module 51 is configured to send signaling to a user equipment, where the signaling carries node indication information, where the node indication information is used to indicate nodes corresponding to channel state information measurement sets configured by the base station for the user equipment, so that the user equipment measures, according to the node indication information, the nodes corresponding to the channel state information measurement sets on a resource corresponding to the channel state information measurement sets configured by the base station for the user equipment; and the receiving module 52 is configured to receive a measurement result reported by the user equipment, and schedule the user equipment according to the measurement result.

In an implementation manner of this embodiment, that the signaling sent by the sending module 51 carries node indication information, where the node indication information is used to indicate nodes corresponding to channel state information measurement sets configured by the base station for the user equipment may be that: a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

The channel state information subframe pattern configuration parameter field may be CSI-SubframePatternConfig-r12, and the channel state information measurement subframe set indication field may be a csi-MeasSubframeSetCellId-r12 field. Certainly, this is merely an example, and this embodiment of the present invention is not limited thereto. Specific representation forms of the channel state information subframe pattern configuration parameter and the channel state information measurement subframe set indication field are not limited in this embodiment of the present invention.

In this case, if the user equipment works in an MSA state, the nodes corresponding to the channel state information measurement sets and indicated by the values of the at least two channel state information measurement subframe set indication fields are completely different or completely the same or partially the same. In this embodiment of the present invention, the base station may configure at least two channel state information measurement sets for the user equipment, and nodes corresponding to the at least two channel state information measurement sets are completely different or completely the same or partially the same.

That nodes corresponding to the at least two channel state information measurement sets are completely different or completely the same or partially the same includes the following cases:

(1) the nodes corresponding to the at least two channel state information measurement sets are completely different;

(2) the nodes corresponding to the at least two channel state information measurement sets are a same node; and (3) some of the at least two channel state information measurement sets correspond to a same node, and the other sets correspond to at least one node.

If the user equipment works in a non-MSA state, the nodes corresponding to the channel state information measurement sets and indicated by the values of the at least two channel state information measurement subframe set indication fields are a same node.

In another implementation manner of this embodiment, the signaling sent by the sending module 51 further carries measurement set indication information, where the measurement set indication information is used to indicate the channel state information measurement sets configured by the base station on the nodes for the user equipment.

Specifically, that the signaling sent by the sending module 51 carries node indication information, where the node indication information is used to indicate nodes corresponding to channel state information measurement sets configured by the base station for the user equipment may be that: a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling sent by the sending module 51 further carries measurement set indication information, where the measurement set indication information is used to indicate the channel state information measurement sets configured by the base station on the nodes for the user equipment may be that: the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

The channel state information measurement subframe indication field may be a csi-MeasSubframeCellId-r12 field, and the channel state information subframe pattern configuration parameter field may be a csi-SubframePatternConfig-r12 field. Certainly, this is merely an example, and this embodiment of the present invention is not limited thereto. Specific representation forms of the channel state information measurement subframe indication field and the channel state information subframe pattern configuration parameter field are not limited in this embodiment of the present invention.

In this case, if the user equipment works in an MSA state, the base station may set the channel state information measurement subframe indication field to a first value, so as to indicate that a first channel state information measurement set configured by the base station for the user equipment corresponds to a first node; and set the channel state information subframe pattern configuration parameter field to a second value, so as to indicate that the first channel state information measurement set configured by the base station on the first node for the user equipment is a set indicated by the second value; and/or the base station sets the channel state information measurement subframe indication field to a third value, so as to indicate that a second channel state information measurement set configured by the base station for the user equipment corresponds to a second node; and sets the channel state information subframe pattern configuration parameter field to a fourth value, so as to indicate that the second channel state information measurement set configured by the base station on the second node for the user equipment is a set indicated by the fourth value.

The foregoing is merely an example, and this embodiment of the present invention is not limited thereto. If the user equipment works in an MSA state, the base station may configure at least two channel state information measurement sets for the user equipment, a channel state information measurement subframe indication field may be newly added to a configuration parameter carried in the signaling, and the channel state information measurement subframe indication field may be set to different values, so as to indicate nodes corresponding to the at least two channel state information measurement sets configured by the base station for the user equipment. It should be noted that the nodes corresponding to the at least two channel state information measurement sets configured by the base station for the user equipment are completely different or completely the same or partially the same, which includes the following cases:

(1) the nodes corresponding to the at least two channel state information measurement sets are completely different;

(2) the nodes corresponding to the at least two channel state information measurement sets are a same node; and (3) some of the at least two channel state information measurement sets correspond to a same node, and the other sets correspond to at least one node.

If the user equipment works in a non-MSA state, the base station sets the channel state information measurement subframe indication field to a fifth value, so as to indicate a node corresponding to channel state information measurement sets configured by the base station for the user equipment; and sets the channel state information subframe pattern configuration parameter field to a sixth value and a seventh value, so as to indicate that the two channel state information measurement sets configured by the base station on the node for the user equipment are a set indicated by the sixth value and a set indicated by the seventh value.

That the base station configures two channel state information measurement sets on a node for the user equipment in a non-MSA state is merely used as an example for description in the foregoing, and this embodiment of the present invention is not limited thereto. If the user equipment works in a non-MSA state, the base station may configure at least one channel state information measurement set on a node for the user equipment, and different values of the channel state information subframe pattern configuration parameter field can indicate the at least one channel state information measurement set configured by the base station on the node for the user equipment.

For example, the base station may set the channel state information measurement subframe indication field to a fifth value, so as to indicate a node corresponding to channel state information measurement sets configured by the base station for the user equipment; and set the channel state information subframe pattern configuration parameter field to a sixth value, a seventh value, and an eighth value, so as to indicate that the channel state information measurement sets configured by the base station on the node for the user equipment are a set indicated by the sixth value, a set indicated by the seventh value, and a set indicated by the eighth value.

In the base station, signaling sent by the sending module 51 to a user equipment carries node indication information, where the node indication information is used to indicate nodes corresponding to channel state information measurement sets configured by the base station for the user equipment. In this way, the user equipment can learn, according to the node indication information, the nodes corresponding to the channel state information measurement sets configured by the base station for the user equipment; then, the user equipment can measure the nodes corresponding to the channel state information measurement sets on a resource corresponding to the channel state information measurement sets configured by the base station for the user equipment and provide feedback, so that the base station can schedule the user equipment according to a measurement result of the user equipment.

Figure 6:
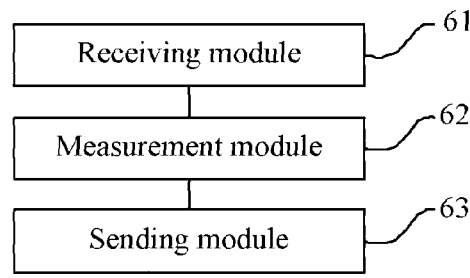
FIG. 6 is a schematic structural diagram of a user equipment according to an embodiment of the present invention.

FIG. 6 is a schematic structural diagram of a user equipment according to an embodiment of the present invention. The user equipment in this embodiment can implement the process of the embodiment shown in FIG. 4 of the present invention. As shown in FIG. 6, the user equipment may include: a receiving module 61, a measurement module 62, and a sending module 63, where the receiving module 61 is configured to receive signaling sent by a base station, where the signaling carries node indication information, where the node indication information is used to indicate nodes corresponding to channel state information measurement sets configured by the base station for the user equipment;

the measurement module 62 is configured to measure, according to the node indication information received by the receiving module 61, the nodes corresponding to the channel state information measurement sets on a resource corresponding to the channel state information measurement sets configured by the base station for the user equipment; and the sending module 63 is configured to report a measurement result acquired by the measurement module 62 to the base station, so that the base station schedules the user equipment according to the measurement result.

In an implementation manner of this embodiment, that the signaling received by the receiving module 61 carries node indication information, where the node indication information is used to indicate nodes corresponding to channel state information measurement sets configured by the base station for the user equipment may be that: a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

The channel state information subframe pattern configuration parameter field may be CSI-SubframePatternConfig-r12, and the channel state information measurement subframe set indication field may be a csi-MeasSubframeSetCellId-r12 field. Certainly, this is merely an example, and this embodiment of the present invention is not limited thereto. Specific representation forms of the channel state information subframe pattern configuration parameter and the channel state information measurement subframe set indication field are not limited in this embodiment of the present invention.

In this case, if the user equipment works in an MSA state, the nodes corresponding to the channel state information measurement sets and indicated by the values of the at least two channel state information measurement subframe set indication fields are completely different or completely the same or partially the same; or if the user equipment works in a non-MSA state, the nodes corresponding to the channel state information measurement sets and indicated by the values of the at least two channel state information measurement subframe set indication fields are a same node.

In another implementation manner of this embodiment, the signaling received by the receiving module 61 further carries measurement set indication information, where the measurement set indication information is used to indicate the channel state information measurement sets configured by the base station on the nodes for the user equipment.

Specifically, that the signaling received by the receiving module 61 carries node indication information, where the node indication information is used to indicate nodes corresponding to channel state information measurement sets configured by the base station for the user equipment may be that: a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling received by the receiving module 61 further carries measurement set indication information, where the measurement set indication information is used to indicate the channel state information measurement sets configured by the base station on the nodes for the user equipment may be that: the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

In this implementation manner, if the user equipment works in an MSA state, when a value of the channel state information measurement subframe indication field is a first value, it indicates that a first channel state information measurement set configured by the base station for the user equipment corresponds to a first node; and when a value of the channel state information subframe pattern configuration parameter field is a second value, it indicates that the first channel state information measurement set configured by the base station on the first node for the user equipment is a set indicated by the second value; and/or when a value of the channel state information measurement subframe indication field is a third value, it indicates that a second channel state information measurement set configured by the base station for the user equipment corresponds to a second node; and when a value of the channel state information subframe pattern configuration parameter field is a fourth value, it indicates that the second channel state information measurement set configured by the base station on the second node for the user equipment is a set indicated by the fourth value.

The foregoing is merely an example, and this embodiment of the present invention is not limited thereto. If the user equipment works in an MSA state, the base station may configure at least two channel state information measurement sets for the user equipment, and in this case, a channel state information measurement subframe indication field may be newly added to a configuration parameter carried in the signaling, where different values of the channel state information measurement subframe indication field indicate nodes corresponding to the at least two channel state information measurement sets configured by the base station for the user equipment. It should be noted that the nodes corresponding to the at least two channel state information measurement sets configured by the base station for the user equipment are completely different or completely the same or partially the same, which includes the following cases:

(1) the nodes corresponding to the at least two channel state information measurement sets are completely different;

(2) the nodes corresponding to the at least two channel state information measurement sets are a same node; and (3) some of the at least two channel state information measurement sets correspond to a same node, and the other sets correspond to at least one node.

If the user equipment works in a non-MSA state, when a value of the channel state information measurement subframe indication field is a fifth value, it indicates a node corresponding to channel state information measurement sets configured by the base station for the user equipment; and when values of the channel state information subframe pattern configuration parameter field are a sixth value and a seventh value, it indicates that the at least two channel state information measurement sets configured by the base station on the node for the user equipment are a set indicated by the sixth value and a set indicated by the seventh value.

That the base station configures two channel state information measurement sets on a node for the user equipment in a non-MSA state is merely used as an example for description in the foregoing, and this embodiment of the present invention is not limited thereto. If the user equipment works in a non-MSA state, the base station may configure at least one channel state information measurement set on a node for the user equipment, and different values of the channel state information subframe pattern configuration parameter field indicate the at least one channel state information measurement set configured by the base station on the node for the user equipment.

For example, the base station may set the channel state information measurement subframe indication field to a fifth value, so as to indicate a node corresponding to channel state information measurement sets configured by the base station for the user equipment; and set the channel state information subframe pattern configuration parameter field to a sixth value, a seventh value, and an eighth value, so as to indicate that the channel state information measurement sets configured by the base station on the node for the user equipment are a set indicated by the sixth value, a set indicated by the seventh value, and a set indicated by the eighth value.

In the foregoing embodiment, signaling received by the receiving module 61 carries node indication information, where the node indication information is used to indicate nodes corresponding to channel state information measurement sets configured by the base station for the user equipment. In this way, the user equipment can learn, according to the node indication information, the nodes corresponding to the channel state information measurement sets configured by the base station for the user equipment; then, the measurement module 62 can measure the nodes corresponding to the channel state information measurement sets on a resource corresponding to the channel state information measurement sets configured by the base station for the user equipment and provide feedback, so that the base station can schedule the user equipment according to a measurement result of the user equipment.

Figure 7:
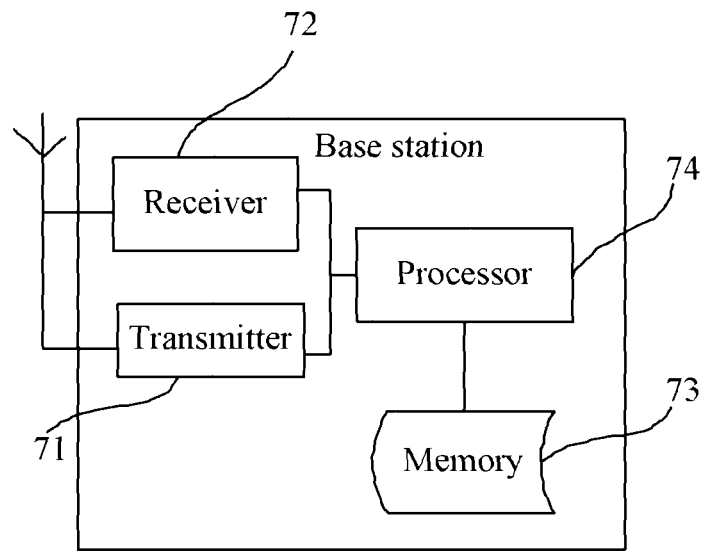
FIG. 7 is a schematic structural diagram of a base station according to another embodiment of the present invention.

FIG. 7 is a schematic structural diagram of a base station according to another embodiment of the present invention. The base station in this embodiment can implement the process of the embodiment shown in FIG. 1 of the present invention. As shown in FIG. 7, the base station may include a transmitter 71, a receiver 72, a memory 73, and a processor 74 that is connected to the transmitter 71, the receiver 72, and the memory 73. Certainly, the base station may further include universal components such as an antenna, a baseband processing component, an intermediate/radio frequency processing component, and an input/output apparatus, which is not limited herein in this embodiment of the present invention.

The memory 73 is configured to store a group of program code;

the processor 74 is configured to invoke the program code stored in the memory 73;

the transmitter 71 is configured to send signaling to a user equipment, where the signaling carries node indication information, where the node indication information is used to indicate nodes corresponding to channel state information measurement sets configured by the base station for the user equipment, so that the user equipment measures, according to the node indication information, the nodes corresponding to the channel state information measurement sets on a resource corresponding to the channel state information measurement sets configured by the base station for the user equipment; and the receiver 72 is configured to receive a measurement result reported by the user equipment, and schedule the user equipment according to the measurement result.

In an implementation manner of this embodiment, that the signaling sent by the transmitter 71 carries node indication information, where the node indication information is used to indicate nodes corresponding to channel state information measurement sets configured by the base station for the user equipment may be that: a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

The channel state information subframe pattern configuration parameter field may be CSI-SubframePatternConfig-r12, and the channel state information measurement subframe set indication field may be a csi-MeasSubframeSetCellId-r12 field. Certainly, this is merely an example, and this embodiment of the present invention is not limited thereto. Specific representation forms of the channel state information subframe pattern configuration parameter and the channel state information measurement subframe set indication field are not limited in this embodiment of the present invention.

In this case, if the user equipment works in an MSA state, the nodes corresponding to the channel state information measurement sets and indicated by the values of the at least two channel state information measurement subframe set indication fields are completely different or completely the same or partially the same. In this embodiment of the present invention, the base station may configure at least two channel state information measurement sets for the user equipment, and nodes corresponding to the at least two channel state information measurement sets are completely different or completely the same or partially the same.

That nodes corresponding to the at least two channel state information measurement sets are completely different or completely the same or partially the same includes the following cases:

(1) the nodes corresponding to the at least two channel state information measurement sets are completely different;

(2) the nodes corresponding to the at least two channel state information measurement sets are a same node; and (3) some of the at least two channel state information measurement sets correspond to a same node, and the other sets correspond to at least one node.

If the user equipment works in a non-MSA state, the nodes corresponding to the channel state information measurement sets and indicated by the values of the at least two channel state information measurement subframe set indication fields are a same node.

In another implementation manner of this embodiment, the signaling sent by the transmitter 71 further carries measurement set indication information, where the measurement set indication information is used to indicate the channel state information measurement sets configured by the base station on the nodes for the user equipment.

Specifically, that the signaling sent by the transmitter 71 carries node indication information, where the node indication information is used to indicate nodes corresponding to channel state information measurement sets configured by the base station for the user equipment may be that: a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling sent by the transmitter 71 further carries measurement set indication information, where the measurement set indication information is used to indicate the channel state information measurement sets configured by the base station on the nodes for the user equipment may be that: the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

The channel state information measurement subframe indication field may be a csi-MeasSubframeCellId-r12 field, and the channel state information subframe pattern configuration parameter field may be a csi-SubframePatternConfig-r12 field. Certainly, this is merely an example, and this embodiment of the present invention is not limited thereto. Specific representation forms of the channel state information measurement subframe indication field and the channel state information subframe pattern configuration parameter field are not limited in this embodiment of the present invention.

In this case, if the user equipment works in an MSA state, the base station may set the channel state information measurement subframe indication field to a first value, so as to indicate that a first channel state information measurement set configured by the base station for the user equipment corresponds to a first node; and set the channel state information subframe pattern configuration parameter field to a second value, so as to indicate that the first channel state information measurement set configured by the base station on the first node for the user equipment is a set indicated by the second value; and/or the base station sets the channel state information measurement subframe indication field to a third value, so as to indicate that a second channel state information measurement set configured by the base station for the user equipment corresponds to a second node; and sets the channel state information subframe pattern configuration parameter field to a fourth value, so as to indicate that the second channel state information measurement set configured by the base station on the second node for the user equipment is a set indicated by the fourth value.

The foregoing is merely an example, and this embodiment of the present invention is not limited thereto. If the user equipment works in an MSA state, the base station may configure at least two channel state information measurement sets for the user equipment, a channel state information measurement subframe indication field may be newly added to a configuration parameter carried in the signaling, and the channel state information measurement subframe indication field may be set to different values, so as to indicate nodes corresponding to the at least two channel state information measurement sets configured by the base station for the user equipment. It should be noted that the nodes corresponding to the at least two channel state information measurement sets configured by the base station for the user equipment are completely different or completely the same or partially the same, which includes the following cases:

(1) the nodes corresponding to the at least two channel state information measurement sets are completely different;

(2) the nodes corresponding to the at least two channel state information measurement sets are a same node; and (3) some of the at least two channel state information measurement sets correspond to a same node, and the other sets correspond to at least one node.

If the user equipment works in a non-MSA state, the base station sets the channel state information measurement subframe indication field to a fifth value, so as to indicate a node corresponding to channel state information measurement sets configured by the base station for the user equipment; and sets the channel state information subframe pattern configuration parameter field to a sixth value and a seventh value, so as to indicate that the two channel state information measurement sets configured by the base station on the node for the user equipment are a set indicated by the sixth value and a set indicated by the seventh value.

That the base station configures two channel state information measurement sets on a node for the user equipment in a non-MSA state is merely used as an example for description in the foregoing, and this embodiment of the present invention is not limited thereto. If the user equipment works in a non-MSA state, the base station may configure at least one channel state information measurement set on a node for the user equipment, and different values of the channel state information subframe pattern configuration parameter field can indicate the at least one channel state information measurement set configured by the base station on the node for the user equipment.

For example, the base station may set the channel state information measurement subframe indication field to a fifth value, so as to indicate a node corresponding to channel state information measurement sets configured by the base station for the user equipment; and set the channel state information subframe pattern configuration parameter field to a sixth value, a seventh value, and an eighth value, so as to indicate that the channel state information measurement sets configured by the base station on the node for the user equipment are a set indicated by the sixth value, a set indicated by the seventh value, and a set indicated by the eighth value.

In the base station, signaling sent by the transmitter 71 to a user equipment carries node indication information, where the node indication information is used to indicate nodes corresponding to channel state information measurement sets configured by the base station for the user equipment. In this way, the user equipment can learn, according to the node indication information, the nodes corresponding to the channel state information measurement sets configured by the base station for the user equipment; then, the user equipment can measure the nodes corresponding to the channel state information measurement sets on a resource corresponding to the channel state information measurement sets configured by the base station for the user equipment and provide feedback, so that the base station can schedule the user equipment according to a measurement result of the user equipment.

Figure 8:
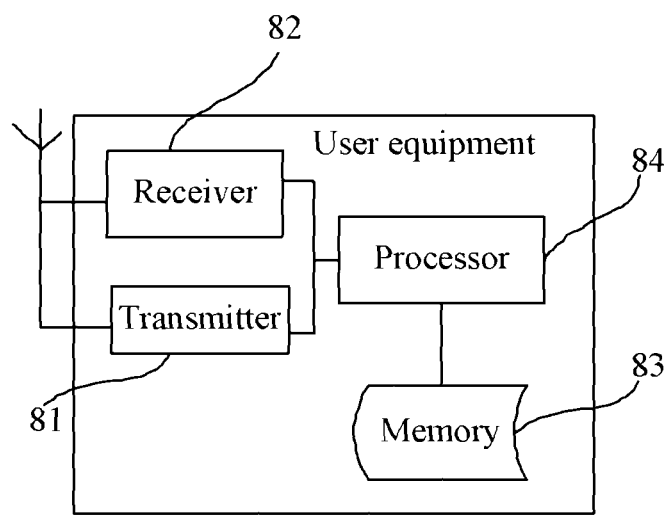
FIG. 8 is a schematic structural diagram of a user equipment according to another embodiment of the present invention.

FIG. 8 is a schematic structural diagram of a user equipment according to another embodiment of the present invention. The user equipment in this embodiment can implement the process of the embodiment shown in FIG. 4 of the present invention. As shown in FIG. 8, the user equipment may include a transmitter 81, a receiver 82, a memory 83, and a processor 84 that is connected to the transmitter 81, the receiver 82, and the memory 83. Certainly, the user equipment may further include universal components such as an antenna, a baseband processing component, an intermediate/radio frequency processing component, and an input/output apparatus, which is not limited herein in this embodiment of the present invention.

The memory 83 is configured to store a group of program code;

the receiver 82 is configured to receive signaling sent by a base station, where the signaling carries node indication information, where the node indication information is used to indicate nodes corresponding to channel state information measurement sets configured by the base station for the user equipment;

the processor 84 is configured to invoke the program code stored in the memory 83, to measure, according to the node indication information received by the receiver 82, the nodes corresponding to the channel state information measurement sets on a resource corresponding to the channel state information measurement sets configured by the base station for the user equipment; and the transmitter 81 is configured to report a measurement result acquired by the processor 84 to the base station, so that the base station schedules the user equipment according to the measurement result.

In an implementation manner of this embodiment, that the signaling received by the receiver 82 carries node indication information, where the node indication information is used to indicate nodes corresponding to channel state information measurement sets configured by the base station for the user equipment may be that: a channel state information subframe pattern configuration parameter carried in the signaling includes at least two newly-added channel state information measurement subframe set indication fields, where values of the at least two channel state information measurement subframe set indication fields indicate the nodes corresponding to the channel state information measurement sets configured by the base station for the user equipment.

The channel state information subframe pattern configuration parameter field may be CSI-SubframePatternConfig-r12, and the channel state information measurement subframe set indication field may be a csi-MeasSubframeSetCellId-r12 field. Certainly, this is merely an example, and this embodiment of the present invention is not limited thereto. Specific representation forms of the channel state information subframe pattern configuration parameter and the channel state information measurement subframe set indication field are not limited in this embodiment of the present invention.

In this case, if the user equipment works in an MSA state, the nodes corresponding to the channel state information measurement sets and indicated by the values of the at least two channel state information measurement subframe set indication fields are completely different or completely the same or partially the same; or if the user equipment works in a non-MSA state, the nodes corresponding to the channel state information measurement sets and indicated by the values of the at least two channel state information measurement subframe set indication fields are a same node.

In another implementation manner of this embodiment, the signaling received by the receiver 82 further carries measurement set indication information, where the measurement set indication information is used to indicate the channel state information measurement sets configured by the base station on the nodes for the user equipment.

Specifically, that the signaling received by the receiver 82 carries node indication information, where the node indication information is used to indicate nodes corresponding to channel state information measurement sets configured by the base station for the user equipment may be that: a configuration parameter carried in the signaling includes a newly-added channel state information measurement subframe indication field, where different values of the channel state information measurement subframe indication field indicate the nodes corresponding to the channel state information measurement sets configured by the base station for the user equipment; and that the signaling received by the receiver 82 further carries measurement set indication information, where the measurement set indication information is used to indicate the channel state information measurement sets configured by the base station on the nodes for the user equipment may be that: the configuration parameter carried in the signaling includes a newly-added channel state information subframe pattern configuration parameter field, where different values of the channel state information subframe pattern configuration parameter field indicate at least one channel state information measurement set configured by the base station on the nodes for the user equipment.

In this implementation manner, if the user equipment works in an MSA state, when a value of the channel state information measurement subframe indication field is a first value, it indicates that a first channel state information measurement set configured by the base station for the user equipment corresponds to a first node; and when a value of the channel state information subframe pattern configuration parameter field is a second value, it indicates that the first channel state information measurement set configured by the base station on the first node for the user equipment is a set indicated by the second value; and/or when a value of the channel state information measurement subframe indication field is a third value, it indicates that a second channel state information measurement set configured by the base station for the user equipment corresponds to a second node; and when a value of the channel state information subframe pattern configuration parameter field is a fourth value, it indicates that the second channel state information measurement set configured by the base station on the second node for the user equipment is a set indicated by the fourth value.

The foregoing is merely an example, and this embodiment of the present invention is not limited thereto. If the user equipment works in an MSA state, the base station may configure at least two channel state information measurement sets for the user equipment, and in this case, a channel state information measurement subframe indication field may be newly added to a configuration parameter carried in the signaling, where different values of the channel state information measurement subframe indication field indicate nodes corresponding to the at least two channel state information measurement sets configured by the base station for the user equipment. It should be noted that the nodes corresponding to the at least two channel state information measurement sets configured by the base station for the user equipment are completely different or completely the same or partially the same, which includes the following cases:

(1) the nodes corresponding to the at least two channel state information measurement sets are completely different;

(2) the nodes corresponding to the at least two channel state information measurement sets are a same node; and (3) some of the at least two channel state information measurement sets correspond to a same node, and the other sets correspond to at least one node.

If the user equipment works in a non-MSA state, when a value of the channel state information measurement subframe indication field is a fifth value, it indicates a node corresponding to channel state information measurement sets configured by the base station for the user equipment; and when values of the channel state information subframe pattern configuration parameter field are a sixth value and a seventh value, it indicates that the at least two channel state information measurement sets configured by the base station on the node for the user equipment are a set indicated by the sixth value and a set indicated by the seventh value.

That the base station configures two channel state information measurement sets on a node for the user equipment in a non-MSA state is merely used as an example for description in the foregoing, and this embodiment of the present invention is not limited thereto. If the user equipment works in a non-MSA state, the base station may configure at least one channel state information measurement set on a node for the user equipment, and different values of the channel state information subframe pattern configuration parameter field indicate the at least one channel state information measurement set configured by the base station on the node for the user equipment.

For example, the base station may set the channel state information measurement subframe indication field to a fifth value, so as to indicate a node corresponding to channel state information measurement sets configured by the base station for the user equipment; and set the channel state information subframe pattern configuration parameter field to a sixth value, a seventh value, and an eighth value, so as to indicate that the channel state information measurement sets configured by the base station on the node for the user equipment are a set indicated by the sixth value, a set indicated by the seventh value, and a set indicated by the eighth value.

In the foregoing embodiment, signaling received by the receiver 82 carries node indication information, where the node indication information is used to indicate nodes corresponding to channel state information measurement sets configured by the base station for the user equipment. In this way, the user equipment can learn, according to the node indication information, the nodes corresponding to the channel state information measurement sets configured by the base station for the user equipment; then, the processor 84 can measure the nodes corresponding to the channel state information measurement sets on a resource corresponding to the channel state information measurement sets configured by the base station for the user equipment and provide feedback, so that the base station can schedule the user equipment according to a measurement result of the user equipment.

Persons skilled in the art may understand that the accompanying drawings are merely schematic diagrams of exemplary embodiments, and modules or processes in the accompanying drawings are not necessarily required for implementing the present invention.

Persons skilled in the art may understand that the modules in the apparatuses in the embodiments may be located in the apparatuses in a distributed manner according to the description of the embodiments, or may be located in one or more apparatuses that are different from those described in the embodiments. The modules in the foregoing embodiments may be combined into one module, or split into multiple submodules.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; however these modifications or replacements do not make the essence of corresponding technical solutions depart from the scope of the technical solutions in the embodiments of the present invention.

What is claimed is:

1. A measurement method, comprising:
    sending, by a base station, signaling to a user equipment, wherein:
        the signaling carries node indication information, and
        the node indication information is used to indicate nodes corresponding to channel state information measurement sets configured by the base station for the user equipment, so that the user equipment measures, according to the node indication information, the nodes corresponding to the channel state information measurement sets on a resource corresponding to the channel state information measurement sets configured by the base station for the user equipment;
    receiving, by the base station, a measurement result reported by the user equipment; and
    scheduling, by the base station, the user equipment according to the measurement result,
    wherein the node indication information comprises a channel state information subframe pattern configuration parameter, which is carried in the signaling, comprising at least two newly-added channel state information measurement subframe set indication fields including a channel state information subframe pattern configuration parameter field CSI-SubframePattern-Config-r12, and a channel state information measurement subframe set indication field csi-MeasSubframe-SetCellId-r12 field.

2. The method according to claim 1,
    wherein values of the at least two channel state information measurement subframe set indication fields indicate the nodes corresponding to the channel state information measurement sets configured by the base station for the user equipment.

3. The method according to claim 1, wherein:
    the signaling further carries measurement set indication information, and
    the measurement set indication information is used to indicate the channel state information measurement sets configured by the base station on the nodes for the user equipment.

4. The method according to claim 2, wherein:
    if the user equipment operates in a multiple-stream-aggregation state, the nodes, corresponding to the channel state information measurement sets and indicated by the values of the at least two channel state information measurement subframe set indication fields, are completely different or completely the same or partially the same; or
    if the user equipment operates in a non-multiple-stream-aggregation state, the nodes, corresponding to the channel state information measurement sets and indicated by the values of the at least two channel state information measurement subframe set indication fields, are the same.

5. A measurement method, comprising:
    receiving, by a user equipment, signaling sent by a base station, wherein:
        the signaling carries node indication information, and
        the node indication information is used to indicate nodes corresponding to channel state information measurement sets configured by the base station for the user equipment;
    measuring, by the user equipment according to the node indication information, the nodes corresponding to the channel state information measurement sets on a resource corresponding to the channel state information measurement sets configured by the base station for the user equipment; and
    reporting, by the user equipment, a measurement result to the base station, so that the base station schedules the user equipment according to the measurement result,
    wherein the node indication information comprises a channel state information subframe pattern configuration parameter, which is carried in the signaling, comprising at least two newly-added channel state information measurement subframe set indication fields including a channel state information subframe pattern configuration parameter field CSI-SubframePattern-Config-r12, and a channel state information measurement subframe set indication field csi-MeasSubframe-SetCellId-r12 field.

6. The method according to claim 5,
    wherein values of the at least two channel state information measurement subframe set indication fields indicate the nodes corresponding to the channel state information measurement sets configured by the base station for the user equipment.

7. The method according to claim 5, wherein:
    the signaling further carries measurement set indication information, and
    the measurement set indication information is used to indicate the channel state information measurement sets configured by the base station on the nodes for the user equipment.

8. The method according to claim 6, wherein:
    if the user equipment operates in a multiple-stream-aggregation state, the nodes, corresponding to the channel state information measurement sets and indicated by the values of the at least two channel state information measurement subframe set indication fields, are completely different or completely the same or partially the same; or if the user equipment operates in a non-multiple-stream-aggregation state, the nodes, corresponding to the channel state information measurement sets and indicated by the values of the at least two channel state information measurement subframe set indication fields, are the same.

9. A base station, comprising:
a transmitter;
a receiver;
a memory; and
a processor that is connected to the transmitter, the receiver, and the memory, wherein:
the memory is configured to store a group of program code;
the processor is configured to invoke the program code stored in the memory;
the transmitter is configured to send signaling to a user equipment, wherein the signaling carries node indication information used to indicate nodes corresponding to channel state information measurement sets configured by the base station for the user equipment, so that the user equipment measures, according to the node indication information, the nodes corresponding to the channel state information measurement sets on a resource corresponding to the channel state information measurement sets configured by the base station for the user equipment; and
the receiver is configured to receive a measurement result reported by the user equipment, and the receiver is configured to schedule the user equipment according to the measurement result,
wherein the node indication information comprises a channel state information subframe pattern configuration parameter, which is carried in the signaling, comprising at least two newly-added channel state information measurement subframe set indication fields including a channel state information subframe pattern configuration parameter field CSI-SubframePattern-Config-r12, and a channel state information measurement subframe set indication field csi-MeasSubframe-SetCellId-r12 field.

10. The base station according to claim 9,
wherein values of the at least two channel state information measurement subframe set indication fields indicate the nodes corresponding to the channel state information measurement sets configured by the base station for the user equipment.

11. The base station according to claim 9, wherein:
the signaling sent by the transmitter further carries measurement set indication information, and
the measurement set indication information is used to indicate the channel state information measurement sets configured by the base station on the nodes for the user equipment.

12. The base station according to claim 10, wherein:
if the user equipment operates in a multiple-stream-aggregation state, the nodes, corresponding to the channel state information measurement sets and indicated by the values of the at least two channel state information measurement subframe set indication fields, are completely different or completely the same or partially the same; or
if the user equipment operates in a non-multiple-stream-aggregation state, the nodes, corresponding to the channel state information measurement sets and indicated by the values of the at least two channel state information measurement subframe set indication fields, are the same.

13. A user equipment, comprising:
a transmitter;
a receiver
a memory; and
a processor that is connected to the transmitter, the receiver, and the memory, wherein:
the memory is configured to store a group of program code;
the receiver is configured to receive signaling sent by a base station, wherein the signaling carries node indication information used to indicate nodes corresponding to channel state information measurement sets configured by the base station for the user equipment;
the processor is configured to invoke the program code stored in the memory, to measure, according to the node indication information received by the receiver, the nodes corresponding to the channel state information measurement sets on a resource corresponding to the channel state information measurement sets configured by the base station for the user equipment; and
the transmitter is configured to report a measurement result acquired by the processor to the base station, so that the base station schedules the user equipment according to the measurement result,
wherein the node indication information comprises a channel state information subframe pattern configuration parameter, which is carried in the signaling, comprising at least two newly-added channel state information measurement subframe set indication fields including a channel state information subframe pattern configuration parameter field CSI-SubframePattern-Config-r12, and a channel state information measurement subframe set indication field csi-MeasSubframe-SetCellId-r12 field.

14. The user equipment according to claim 13,
wherein values of the at least two channel state information measurement subframe set indication fields indicate the nodes corresponding to the channel state information measurement sets configured by the base station for the user equipment.

15. The user equipment according to claim 13, wherein:
the signaling received by the receiver further carries measurement set indication information, and
the measurement set indication information is used to indicate the channel state information measurement sets configured by the base station on the nodes for the user equipment.

16. The user equipment according to claim 14, wherein:
if the user equipment operates in a multiple-stream-aggregation state, the nodes, corresponding to the channel state information measurement sets and indicated by the values of the at least two channel state information measurement subframe set indication fields, are completely different or completely the same or partially the same; or
if the user equipment operates in a non-multiple-stream-aggregation state, the nodes, corresponding to the channel state information measurement sets and indicated by the values of the at least two channel state information measurement subframe set indication fields, are same.

* * * * *